United States Patent [19]
Schaenzer

[11] Patent Number: 6,023,378
[45] Date of Patent: Feb. 8, 2000

[54] OPTICAL DATA STORAGE SYSTEM WITH IMPROVED HEAD LENS ASSEMBLY

[75] Inventor: Mark J. Schaenzer, Eagan, Minn.

[73] Assignee: Seagate Technology, Inc., Scotts Valley, Calif.

[21] Appl. No.: 09/073,582

[22] Filed: May 6, 1998

Related U.S. Application Data

[60] Provisional application No. 60/071,809, Jan. 20, 1998.

[51] Int. Cl.[7] ............................ G02B 7/02; G11B 7/00
[52] U.S. Cl. .................... 359/819; 369/112; 369/44.23
[58] Field of Search .......................... 359/819, 808; 369/112

[56] References Cited

U.S. PATENT DOCUMENTS

| | | | |
|---|---|---|---|
| 3,980,811 | 9/1976 | Schaefer et al. | 178/6.6 |
| 4,229,067 | 10/1980 | Love | 350/96.15 |
| 4,310,916 | 1/1982 | Dil | 369/109 |
| 4,443,700 | 4/1984 | Macedo et al. | 250/227 |
| 4,569,038 | 2/1986 | Nagashima et al. | 369/44 |
| 4,581,529 | 4/1986 | Gordon | 250/227 |
| 4,706,235 | 11/1987 | Melbye | 369/46 |
| 4,769,800 | 9/1988 | Moser et al. | 369/32 |
| 4,815,064 | 3/1989 | Melbye | 369/59 |
| 4,933,537 | 6/1990 | Takahashi et al. | 235/454 |
| 4,994,658 | 2/1991 | Takahashi et al. | 235/473 |
| 5,004,307 | 4/1991 | Kino et al. | 350/1.2 |
| 5,095,477 | 3/1992 | Shimozawa | 369/112 |
| 5,096,277 | 3/1992 | Kleinerman | 385/12 |
| 5,125,750 | 6/1992 | Corle et al. | 359/819 |
| 5,138,676 | 8/1992 | Stowe et al. | 385/32 |
| 5,153,870 | 10/1992 | Lee et al. | 369/111 |
| 5,193,132 | 3/1993 | Uken et al. | 385/32 |
| 5,212,379 | 5/1993 | Nafarrate et al. | 250/227.14 |
| 5,278,812 | 1/1994 | Adar et al. | 369/44.12 |
| 5,286,971 | 2/1994 | Betzig et al. | 250/227.26 |
| 5,363,463 | 11/1994 | Kleinerman | 385/123 |
| 5,364,742 | 11/1994 | Fan et al. | 430/317 |
| 5,450,203 | 9/1995 | Penkethman | 356/373 |
| 5,493,393 | 2/1996 | Beranek et al. | 356/328 |
| 5,497,359 | 3/1996 | Mamin et al. | 369/44.15 |
| 5,535,189 | 7/1996 | Alon et al. | 369/102 |
| 5,537,385 | 7/1996 | Alon et al. | 369/119 |
| 5,566,159 | 10/1996 | Shapira | 369/99 |
| 5,574,712 | 11/1996 | Alon et al. | 369/102 |
| 5,592,444 | 1/1997 | Alon et al. | 369/13 |
| 5,598,393 | 1/1997 | Alon et al. | 369/102 |
| 5,781,351 | 7/1998 | Murakami et al. | 359/808 |
| 5,828,644 | 10/1998 | Gage et al. | 369/112 |
| 5,831,797 | 11/1998 | Schaenzer et al. | 360/114 |
| 5,870,362 | 2/1999 | Boutaghou | 369/44.14 |
| 5,881,042 | 3/1999 | Knight | 369/99 |

*Primary Examiner*—Georgia Epps
*Assistant Examiner*—Saeed Seyrafi
*Attorney, Agent, or Firm*—Westman, Champlin & Kelly, P.A.

[57] ABSTRACT

An optical data storage system and a method of assembling the same are disclosed. The storage system includes an optical disc having a data surface, a transducing mechanism including an objective lens, a slider positioned adjacent the data surface, and a lens mount coupled to the slider and to the objective lens and supporting the objective lens relative to the slider. The lens mount forms an aperture in which the objective lens is at least partially inserted. First and second slots formed in the lens mount provide lateral access to the objective lens in the aperture for adjusting a position of the objective lens within the aperture.

14 Claims, 4 Drawing Sheets

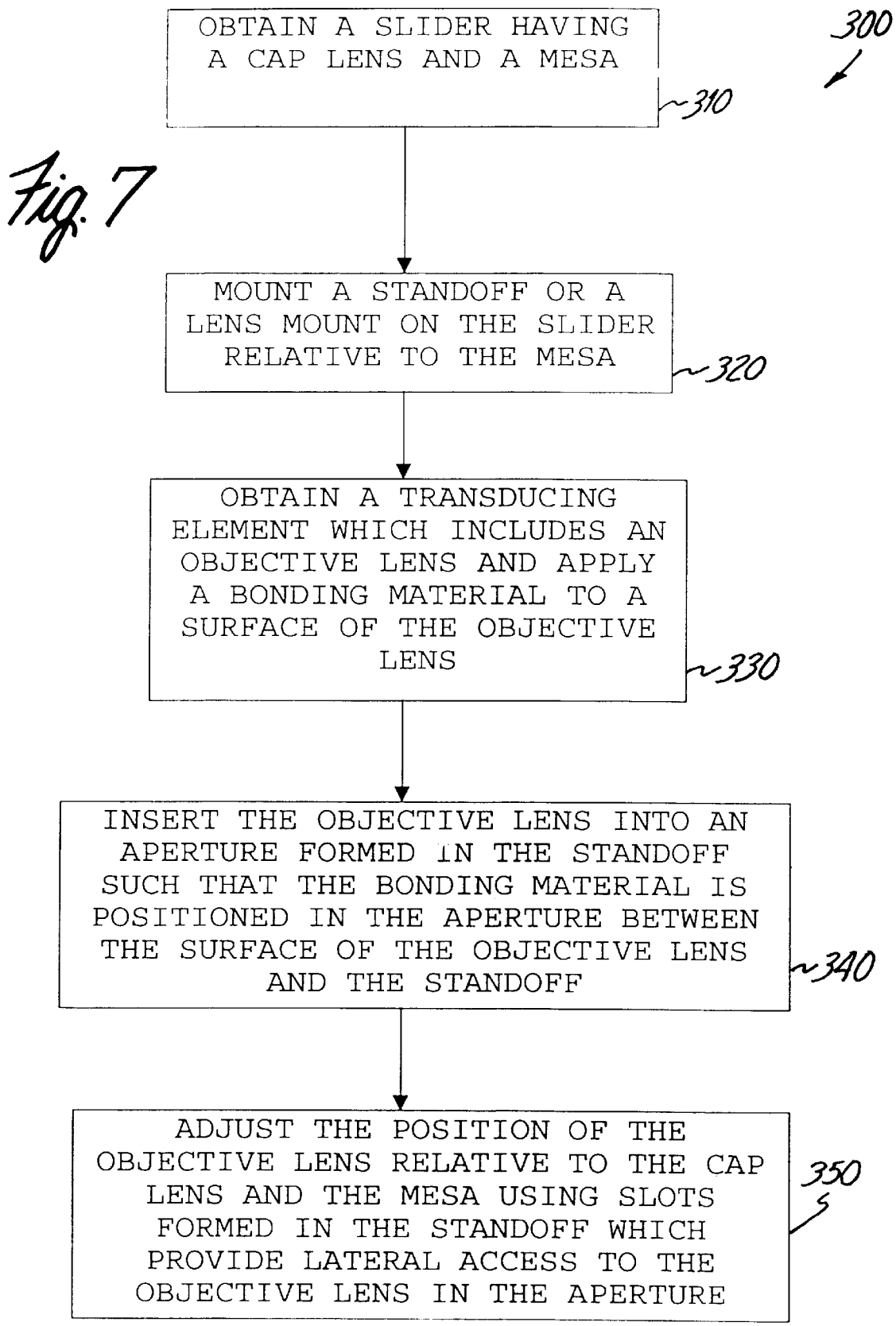

OPTICAL DATA STORAGE SYSTEM WITH IMPROVED HEAD LENS ASSEMBLY

The present invention claims priority to Provisional Application Serial No. 60/071,809, filed Jan. 20, 1998 and entitled IMPROVED OPTICAL HEAD LENS ASSEMBLY, herein incorporated by reference.

BACKGROUND OF THE INVENTION

The present invention relates to optical data storage systems. More specifically, the present invention relates to optical data storage systems which include an objective lens coupled to a slider.

Optical data storage disc systems are a promising technology for storing large quantities of data. The data is accessed by focusing a laser beam onto a data surface of the disc and analyzing light reflected from or transmitted through the data surface. In general, in optical storage systems, data is in the form of marks carried on the surface of the disc which are detected using the reflected laser light. There are a number of different optical disc technologies which are known in the industry. For example, compact discs are currently used to store digital data such as computer programs or digitized music. Typically, compact discs are permanently recorded during manufacture. Another type of optical system is a write-once read-many (WORM) system in which a user may permanently write information onto a blank disc. Other types of systems are erasable, such as phase change and magneto-optic (M-O) systems. Phase change systems detect data by sensing a change in reflectivity. M-O systems read data by measuring the rotation of the incident light polarization due to the storage medium.

The above systems require a beam of light to be focused onto a data surface of a disc and recovering the reflected light. Storage density is determined not only be the size of the markings on the data surface, but also by the size of the beam focused on the surface (i.e. resolution). One type of optical element which can be used in conjunction with an objective lens to reduce the ultimate spot size of the light beam is a Solid Immersion Lens or SIL. A SIL, which is sometimes referred to as a cap lens, reduces the beam spot size by virtue of the wavelength reduction which occurs when light is inside an optically dense medium. The SIL is positioned very close to the data surface of the disc and couples light to the disc surface via evanescent wave effects. This is often referred to as the "near-field" regime. The use of SILs for data storage is described in U.S. Pat. No. 5,125,750 to Corle et al. which issued Jun. 30, 1992 and in U.S. Pat. No. 5,497,359 to Mamin et al. which issued Mar. 5, 1996. In these optical systems, a laser beam is focused onto the SIL using an objective lens. The SIL is preferably carried on a slider and the slider is positioned close to the disc data surface.

One difficulty encountered in prior art near field recording heads is correctly focussing light from an optical source onto the data surface of the storage medium. For example, in near field recording heads in which the objective lens of the optical lens assembly is mounted on top of a lens mount or standoff using epoxy, a problem arises when the optical assembly is exposed to different temperatures. The coefficient of expansion of the epoxy allows it to expand beyond the total tolerance between the objective and cap lenses, thereby changing the alignment of the objective lens and adversely affecting the focus.

SUMMARY OF THE INVENTION

An optical data storage system and a method of assembling the same are disclosed. The storage system includes an optical disc having a data surface, a transducing mechanism including an objective lens, a slider positioned adjacent the data surface, and a lens mount coupled to the slider and to the objective lens and supporting the objective lens relative to the slider. The lens mount forms an aperture in which the objective lens is at least partially inserted. First and second slots formed in the lens mount provide lateral access to the objective lens in the aperture for adjusting a position of the objective lens within the aperture. A bonding material is positioned in the aperture between the objective lens and the lens mount such that a change in a distance between the objective lens and a second lens mounted on the slider is minimized during thermal expansion of the bonding material.

BRIEF DESCRIPTION OF THE DRAWINGS

FIG. 7 is a flow diagram illustrating a method of assembling the optical head sliders of the present invention.

DETAILED DESCRIPTION OF THE PREFERRED EMBODIMENTS

Figure 1:
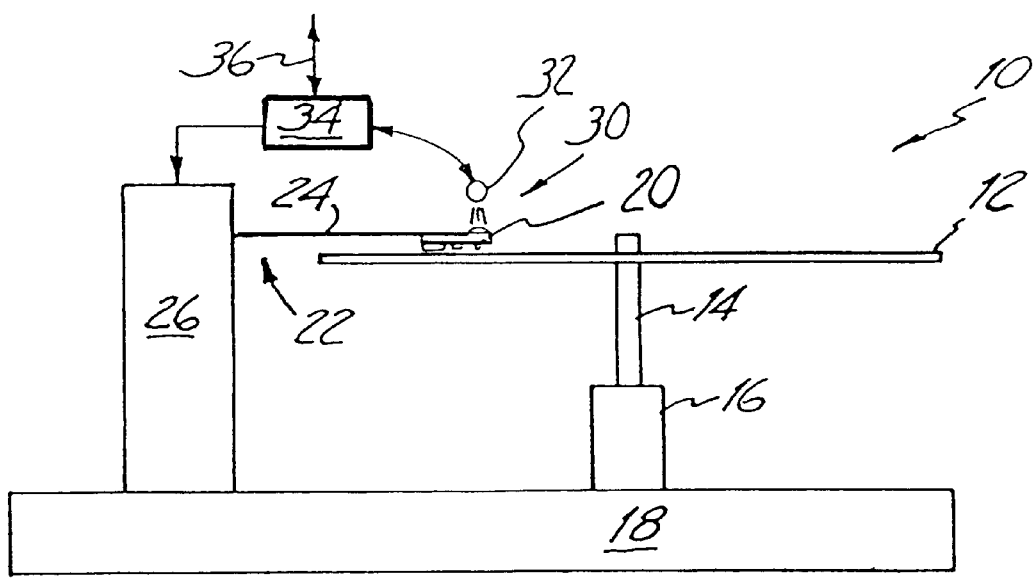
FIG. 1 is a simplified diagram showing an optical storage system using a lens mount in accordance with one embodiment of the present invention.

FIG. 1 is a simplified illustration of an optical recording system 10 employing a cap lens or Solid Immersion Lens (SIL) and a lens mount in accordance with the present invention. System 10 includes optical disc 12 having a data surface which carries optically encoded information. Disc 12 rotates about spindle 14 and is driven by a spindle motor 16 mounted on base 18. A slider 20 is positioned proximate disc 12 and is coupled to an actuator 22 which includes armature 24 and actuator motor 26 which couples to base 18. Slider 20 includes optical elements or lens assembly 30 in accordance with the present invention. Optical lens assembly 30 typically includes an objective lens, a lens mount or standoff, and a SIL or cap lens. An optical source/sensor apparatus 32 is optically coupled to elements 30 through a mirror or other mechanism. A controller 34 couples to apparatus 32, actuator 26 and data bus 36 and is used for controlling operation of system 10. Although not shown, slider 20 in a near field recording head can include a magnetic coil for writing data onto disc 12.

During operation, disc 12 rotates and slider 20 is positioned radially over the data surface of disc 12 using actuator 22. Controller 34 controls the position of slider 20, whereby information may be read from (and in some embodiments written to) the data surface of disc 12 using optical source/sensor apparatus 32 and optical lens assembly 30. Precise control of spot position is achieved by controller 34 scanning the spot across the disc surface over several tracks. For example, this could be by moving a mirror between optical source/sensor apparatus 32 and optical lens assembly 30.

The precise configuration of apparatus of 32 may be selected based upon the type of storage system 10 employed. In general, source/sensor apparatus 32 includes an optical source which directs light toward optical elements 30 for illuminating the data surface of disc 12. Light is reflected back through optical elements 30 from the data surface of disc 12 for detection by apparatus 32. Controller 34 senses the reflected signal which is converted to data for transmission on data bus 36.

Figure 2:
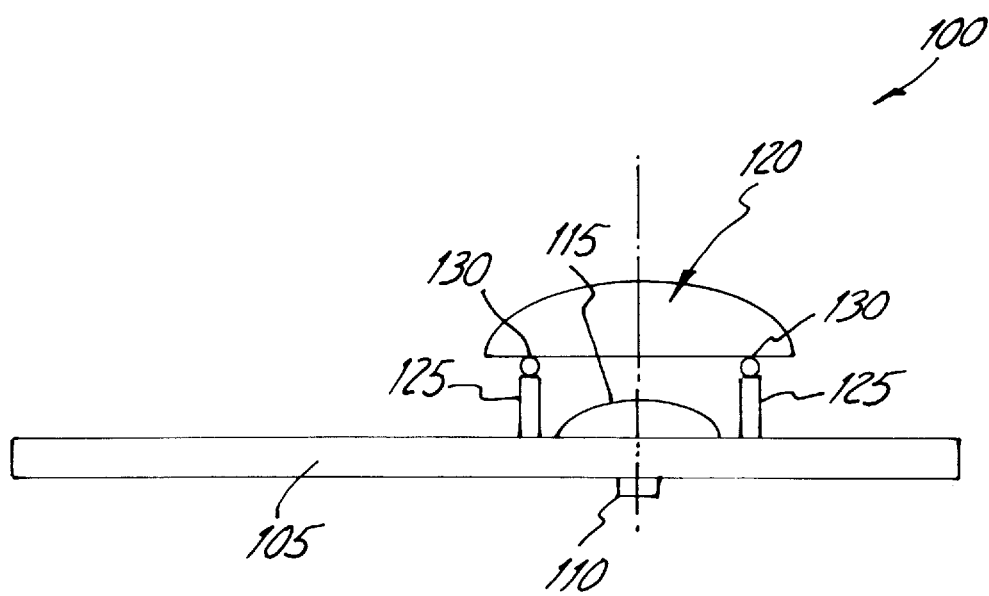
FIG. 2 is a simplified diagram showing a prior art optical head slider having an objective lens mounted to the slider in a conventional manner.

FIG. 2 is an elevation view of a portion of a prior art optical head 100. Prior art optical head 100 includes slider body 105, slider mesa 110, SIL or cap lens 115, objective lens 120, and standoff or lens mount 125. There are two critical alignments in prior art slider 100. First, cap lens 115 is aligned to slider mesa 110. Standoff 125 is "roughly" aligned to cap lens 115 and serves as support for objective lens 120. Objective lens 120 is aligned to cap lens 115. The height of the objective lens to the cap lens is critical for the focus of the objective lens. To accomplish the height alignment, a bead 130 of epoxy, nominally 75 uM thick, is used to support the objective lens. The epoxy is cured with a UV light source as the objective lens is held in relation to the cap lens.

The alignment between the objective lens and the cap lens is critical for the focus and spot size of the laser. The focus requires that the distance between the objective lens and the cap lens be maintained to around one micron. The problem arises when the optical assembly is exposed to a temperature range which is constant with the operating conditions of the typical storage device. The epoxy used for this application has a typical thermal expansion coefficient of $200 \times 10^{-6}$. For a temperature range of 100 degrees C. (−40 to 60 C.) this corresponds to an expected range of motion of 1.5 uM (given a 75 uM epoxy bond line). The total assembly tolerance for the objective lens to the cap lens is given at ±0.25 uM. As can be seen, the epoxy alone accounts for three times the accepted tolerance.

A critical flaw in the above assembly is the 75 uM bead of epoxy. Epoxies by nature have a fairly high thermal coefficient of expansion. The proposed solution to this problem is to mechanically integrate the objective lens and the standoff. This is accomplished by making the standoff taller and making the objective lens cylindrical. The objective lens is then slid inside of the standoff. Epoxy is then used to bond the objective lens to the standoff. To provide for the focus adjustment and to minimize the thermal expansion of the epoxy, the preferred embodiment of the present invention described below can be used.

Figure 3:
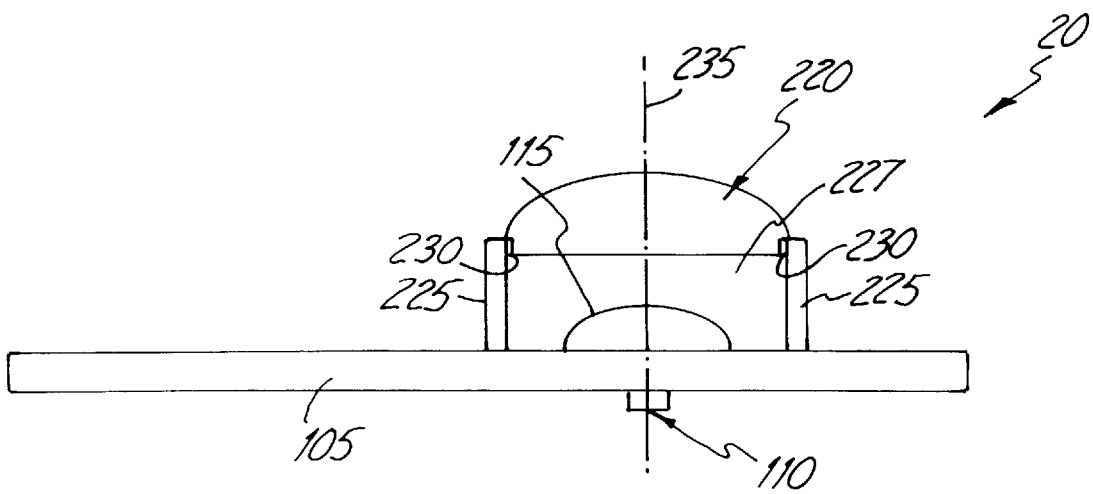
FIG. 3 is a simplified diagram showing an optical head slider having an objective lens mounted to the slider in accordance with the present invention.

FIG. 3 illustrates a first preferred embodiment of optical head slider 20 in accordance with the present invention. In the embodiment illustrated in FIG. 3, head slider 20 includes slider body 105, slider mesa 110, cap lens or SIL 115, objective lens 220, lens mount or standoff 225 and bonding material 230. Slider body 105 is preferably made from a transparent material. With cap lens 115 properly aligned relative to mesa 110 and optical path 235, standoff 225 is mounted or secured to slider body 105. Bonding material 230, such as a UV curable epoxy, is deposited on an outer surface of objective lens 220. In a preferred embodiment, objective lens 220 is cylindrical in shape, as is standoff 225. Objective lens 220 is then inserted into aperture 227 formed in standoff 225 such that bonding material 230 is positioned laterally between objective lens 220 and standoff 225. Thus, thermal expansion or contraction of bonding material 230 will push or pull on standoff 225, but will not raise or lower objective lens 220 in the direction of optical path 235.

Figure 4:
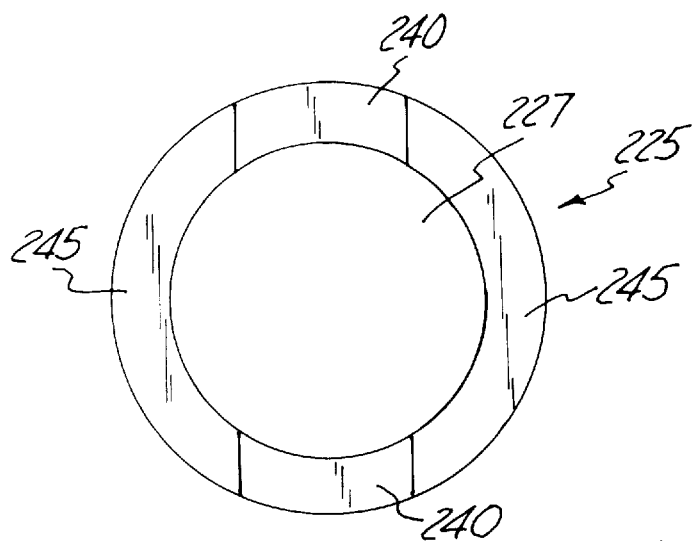
FIG. 4 is a top view of one embodiment of the lens mount or standoff illustrated in FIG. 3.
Figure 5:
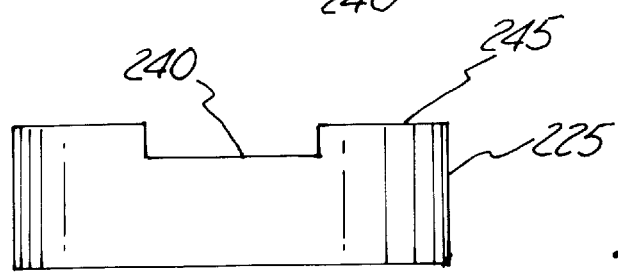
FIG. 5 is a side view of the lens mount or standoff illustrated in FIGS. 3 and 4.

Standoff 225 can be fabricated to allow the objective lens 220 to be held and adjusted in height relative to cap lens 115. This is accomplished by "notching" the standoff as illustrated in FIGS. 4 and 5. Standoff 225 is cylindrical in shape and includes notches or slots 240 between wing regions 245. Notches 240 provide lateral access to objective lens 220 for use in moving objective lens 220 up and down within aperture 227 along optical path 235. Preferably, standoff 225 and objective lens 220 are fabricated such that the clearance between them is less than 25 uM. Because the epoxy 230 is placed between the objective lens and the standoff in a lateral direction (substantially perpendicular to the direction of optical path 235), the expansion and contraction does not raise and lower the objective lens. The expansion and contraction will pull or push on the wings 245 of the standoff. Although only one slot 240 is shown, multiple slots can be used.

During the objective lens assembly process slots 240 in the standoff provide an area to hold the edges of objective lens 220. This allows the accurate assembly of the objective lens to cap lens 115. Once the proper height is established, then the UV curable epoxy is activated with a UV light source.

Another consideration to this assembly process is locating the standoff relative to the cap lens. Since the cap lens is set relative to mesa 110, alignment targets 250 are provided for assembling both the cap lens and the standoff relative to the slider mesa. Targets 250 are illustrated in the bottom view of FIG. 6. These targets can be fabricated using the photolithography process which is used to fabricate slider mesa 110.

Figure 6:
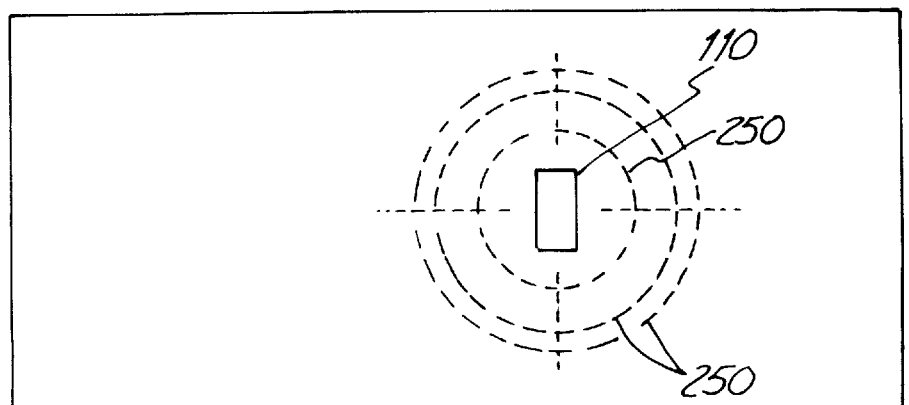
FIG. 6 is a simplified diagram showing a bottom view of the optical head slider illustrated in FIG. 3.

Targets 250 can be designed for use with machine vision to facilitate the automated assembly of the cap lens and the standoff. Because slider body 105 is preferably clear, targets 250 can be fabricated on the top or bottom of the slider body. FIG. 6 illustrates one of many possible target designs. The final target design and location (on the top or bottom of the slider body) is best determined by considering the photolithography processes and machine vision acquisition optimization.

FIG. 7 is a flow diagram illustrating one preferred method of assembling the optical heads of the present invention. As illustrated, at block 310, a slider designed to move adjacent a data surface of an optical storage medium is obtained. The slider has a cap lens and a mesa. At block 320, a lens mount or standoff is mounted on the slider relative to the mesa. Mounting the standoff on the slider relative to the mesa can include mounting the standoff on the slider using a first target formed on the slider in a position which facilitates alignment of the standoff relative to the mesa. Further, mounting the standoff can be implemented using an automated process to mount the standoff on the slider. The automated process would preferably use machine vision and the first target to align the standoff relative to the mesa.

At block 330, a transducing element which includes an objective lens is obtained. A bonding material, for example UV curable epoxy, is applied to a surface of the objective lens.

At block 340, the objective lens is inserted into an aperture formed in the standoff such that the bonding material is positioned in the aperture between the surface of the objective lens and the standoff. The bonding material is preferably positioned in lateral directions, perpendicular to the direction of the optical path, between the objective lens and the standoff. At block 350, the position of the objective lens relative to the cap lens and the mesa is adjusted using slots formed in the standoff which provide lateral access to the objective lens in the aperture. Adjusting the position of the objective lens relative to the cap lens and the mesa using the slots formed in the standoff typically includes laterally accessing the objective lens positioned in the aperture using the slots to thereby adjust an insertion distance of the objective lens into the aperture. Once the position of the objective lens is adjusted as desired, the bonding material is cured to maintain the objective lens in the adjusted position.

A primary benefit of this improved assembly process is the improved thermal performance of the optical assembly. The assembly process outlined allows for current assembly processes to assemble the objective lens relative to the cap lens. Also the current epoxy can also be used. Standoff 225 is fabricated using molding or machining processes. The effect of the thermal expansion is minimized by maintaining the size differential between the objective lens and the standoff less than 25 uM.

The alignment targets facilitate the alignment of the cap lens to the mesa and the standoff to the cap lens. The alignment targets also enable the use of automated assembly including machine vision systems. These targets are easily fabricated as part of the slider fabrication process without the need for an additional fabrication step. Seed layers are used as part of the bond pad process (on the top of the slider) and also as part of the cavity etching process (on the bottom of the slider).

Although the present invention has been described with reference to preferred embodiments, workers skilled in the art will recognize that changes may be made in form and detail without departing from the spirit and scope of the invention.

What is claimed is:

1. An optical data storage system, comprising:
    an optical disc having a data surface;
    a transducing mechanism including an objective lens;
    a slider positioned adjacent the data surface;
    a lens mount coupled to the slider and to the objective lens and supporting the objective lens relative to the slider, the lens mount forming an aperture in which the objective lens is at least partially inserted, the lens mount also forming first and second slots providing lateral access to the objective lens in the aperture;
    a second lens coupled to the slider;
    a slider mesa positioned on the slider;
    a first target formed on the slider in a position which facilitates alignment of the second lens relative to the mesa; and
    a second target formed on the slider in a position which facilitates alignment of the lens mount relative to the mesa.

2. The optical data storage system of claim 1, wherein the slots are disposed opposite one another on the lens mount.

3. The optical data storage system of claim 2, wherein the lens mount is a cylindrical lens mount.

4. The optical storage system of claim 2, wherein the objective lens is focused on the second lens.

5. The optical data storage system of claim 4, wherein the second lens comprises a Solid Immersion Lens (SIL).

6. The optical data storage system of claim 4, and further comprising a bonding material positioned between the objective lens and the lens mount in the aperture to secure the objective lens to the lens mount, the bonding material being positioned relative to the objective lens and the lens mount such that a change in a distance between the objective lens and a the second lens coupled to the slider is minimized during thermal expansion of the bonding material.

7. The optical data storage system of claim 6, wherein the bonding material is epoxy.

8. The optical data storage system of claim 6, wherein the first and second targets are photolithography formed targets adapted for identification by machine vision to facilitate an automated assembly of the second lens and the slider mount relative to the slider mesa.

9. A method of manufacturing an optical storage system, comprising:
    obtaining a slider designed to move adjacent a data surface of an optical storage medium, the slider having a cap lens and a mesa positioned thereon;
    mounting a standoff on the slider relative to the mesa using a first target formed on the slider in a position which facilitates alignment of the standoff relative to the mesa;
    obtaining a transducing element which includes an objective lens;
    applying a bonding material to a surface of the objective lens;
    inserting the objective lens into an aperture formed in the standoff such that the bonding material is positioned in the aperture between the surface of the objective lens and the standoff; and
    adjusting a position of the objective lens relative to the cap lens and the mesa using slots formed in the standoff which provide lateral access to the objective lens in the aperture.

10. The method of claim 9, wherein mounting the standoff on the slider further comprises using an automated process to mount the standoff on the slider, the automated process including using machine vision and the first target to align the standoff relative to the mesa.

11. The method of claim 9, wherein adjusting the position of the objective lens relative to the cap lens and the mesa using slots formed in the standoff further includes laterally accessing the objective lens positioned in the aperture using the slots to thereby adjust an inserting distance of the objective lens into the aperture.

12. The method of claim 11, and further comprising curing the bonding material once the position of the objective lens is adjusted to maintain the objective lens in the adjusted position.

13. The method of claim 12, wherein the bonding material is an epoxy and curing the bonding material further comprises activating the epoxy with a UV light source.

14. An optical data storage system, comprising:
    an optical disc having a data surface;
    a transducing mechanism including an objective lens;
    a slider positioned adjacent the data surface; and
    a lens mount coupled to the slider and to the objective lens, the lens mount forming an aperture in which the objective lens is a t least partially inserted and wherein the objective lens is supported relative to the slider solely by an adhesive applied to the lens mount and objective, lens, the lens mount also forming first and second slots providing lateral access to the objective lens in the aperture.

* * * * *

UNITED STATES PATENT AND TRADEMARK OFFICE
CERTIFICATE OF CORRECTION

PATENT NO. : 6,023,378
DATED : February 8, 2000
INVENTOR(S) : Mark J. Schaenzer

It is certified that error appears in the above-identified patent and that said Letters Patent is hereby corrected as shown below:

Col. 6, line 59, after "objective" delete "," first occurrence.

Signed and Sealed this

Twenty-fourth Day of April, 2001

Attest:

NICHOLAS P. GODICI

*Attesting Officer*     *Acting Director of the United States Patent and Trademark Office*